United States Patent
Ren et al.

(10) Patent No.: US 11,150,771 B2
(45) Date of Patent: Oct. 19, 2021

(54) TOUCH PANEL AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Huaisen Ren, Beijing (CN); Yuanzheng Guo, Beijing (CN); Wei Xia, Beijing (CN); Jie Li, Beijing (CN); Peng Hou, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/940,052

(22) Filed: Jul. 27, 2020

(65) Prior Publication Data
US 2021/0089165 A1 Mar. 25, 2021

(30) Foreign Application Priority Data
Sep. 25, 2019 (CN) .......................... 201910913845.2

(51) Int. Cl.
*G06F 3/044* (2006.01)

(52) U.S. Cl.
CPC .......... *G06F 3/0443* (2019.05); *G06F 3/0446* (2019.05); *G06F 2203/04103* (2013.01); *G06F 2203/04111* (2013.01)

(58) Field of Classification Search
None
See application file for complete search history.

(56) References Cited

U.S. PATENT DOCUMENTS

2018/0188851 A1* 7/2018 Choi .................... H05K 3/0014

* cited by examiner

*Primary Examiner* — Duane N Taylor, Jr.
(74) *Attorney, Agent, or Firm* — Muncy, Geissler, Olds & Lowe, P.C.

(57) ABSTRACT

A touch panel and a display device are provided. The touch panel includes a substrate; a base layer located on a side of the substrate, the base layer being provided with at least one groove, and each groove being located between two adjacent first sub-electrodes in a first direction and located between two adjacent second sub-electrodes in a second direction; at least one bridge electrode, each bridge electrode being located in the groove; a filling layer located on a side of the bridge electrode away from the groove; at least one connection electrode, each connection electrode being located on a side of the filling layer away from the groove, and configured to connect two adjacent first sub-electrodes in the first direction; where each bridge electrode is configured to connect two adjacent second sub-electrodes in the second direction.

12 Claims, 3 Drawing Sheets

TOUCH PANEL AND DISPLAY DEVICE

CROSS-REFERENCE TO RELATED APPLICATION

The present application claims a priority to Chinese Patent Application No. 201910913845.2 filed in China on Sep. 25, 2019, the disclosure of which is incorporated herein in its entirety by reference.

TECHNICAL FIELD

The present disclosure relates to the field of touch panel technology, and in particular to a touch panel and a display device.

BACKGROUND

Common touch panel technologies include the resistive, infrared, acoustic wave, and capacitive sensing, among which the capacitive sensing has been widely used due to its advantages such as low cost, true multi-touch capability and fast response speed. The capacitive sensing employs a bridge design and ascertains the specific touch position on the panel by measuring the capacitance variances at the positions of the touch electrodes.

In conventional bridge structure design of capacitive touch panel, bridge electrodes are generally formed first, then the first touch electrodes and the second touch electrodes intersecting each other and insulating from each other are disposed by forming via holes. However, the patterned bridge electrodes not only negatively impact the evenness of touch electrodes, but also thicken the touch panel.

SUMMARY

In a first aspect of the present disclosure, a touch panel is provided.

According to some embodiments of the present disclosure, the touch panel includes: a substrate; a base layer located on a side of the substrate, where the base layer is provided with at least one groove, each of the at least one groove is located between two adjacent first sub-electrodes in a first direction and located between two adjacent second sub-electrodes in a second direction; at least one bridge electrode, where each of the at least one bridge electrode is located in one of the at least one groove; a filling layer, located on a side of the at least one bridge electrode away from the at least one groove; at least one connection electrode, where the at least one connection electrode is located on a side of the filling layer away from the at least one groove, and each of the at least one connection electrode is configured to connect two adjacent first sub-electrodes in the first direction; where each of the at least one bridge electrode is configured to connect two adjacent second sub-electrodes in the second direction.

According to some embodiments of the present disclosure, each of the at least one bridge electrode covers a bottom and a side wall of one of the at least one groove.

According to some embodiments of the present disclosure, the at least one connection electrode and the first sub-electrodes are integrally formed.

According to some embodiments of the present disclosure, the at least one connection electrode, the first sub-electrodes and the second sub-electrodes are arranged in a same layer.

According to some embodiments of the present disclosure, an overlapping portion of an orthographic projection of the at least one connection electrode onto the substrate and an orthographic projection of the at least one bridge electrode onto the substrate is within an orthographic projection of the filling layer onto the substrate.

According to some embodiments of the present disclosure, a slope angle of the groove ranges from 20 degrees to 70 degrees.

According to some embodiments of the present disclosure, a depth of each of the at least one groove is greater than a thickness of each of the at least one bridge electrode.

According to some embodiments of the present disclosure, a length of each of the at least one groove in the second direction is greater than a width of each of the at least one connection electrode in the second direction.

According to some embodiments of the present disclosure, the filling layer is made of an organic material.

According to some embodiments of the present disclosure, the touch panel further includes:
  a passivation layer, wherein the a passivation layer cover the first sub-electrodes, the second sub-electrodes, the at least one connection electrode, the filling layer and a part of the base layer.

According to some embodiments of the present disclosure, the first direction is perpendicular to the second direction.

In a second aspect of the present disclosure, a display device including the foregoing touch panel is provided.

In a third aspect, a method of manufacturing a touch panel is provided. The method includes:
  providing a substrate;
  forming a base layer on a side of the substrate;
  etching the base layer to form at least one groove;
  preparing a bridge electrode along a second direction in each of the at least one groove;
  forming a filling layer on a side of the bridge electrode away from the at least one groove;
  forming at least one connection electrode along a first direction, at least one first sub-electrode and at least one second sub-electrode on the base layer and the filling layer through a single patterning process.

According to some embodiments of the present disclosure, the method of manufacturing the touch panel further includes forming a passivation layer on the at least one first sub-electrode, the at least one second sub-electrode, the at least one connection electrode, the filling layer and a part of the base layer.

According to some embodiments of the present disclosure, the first direction is perpendicular to the second direction.

Some of additional aspects and advantages of the present disclosure will be given in the following description, and some will become apparent from the following description, or be learned through the practice of the present disclosure.

BRIEF DESCRIPTION OF THE DRAWINGS

The above-mentioned aspects of the present disclosure will be explained in conjunction with the description of the embodiments and the following drawings, where.

Figure 1:
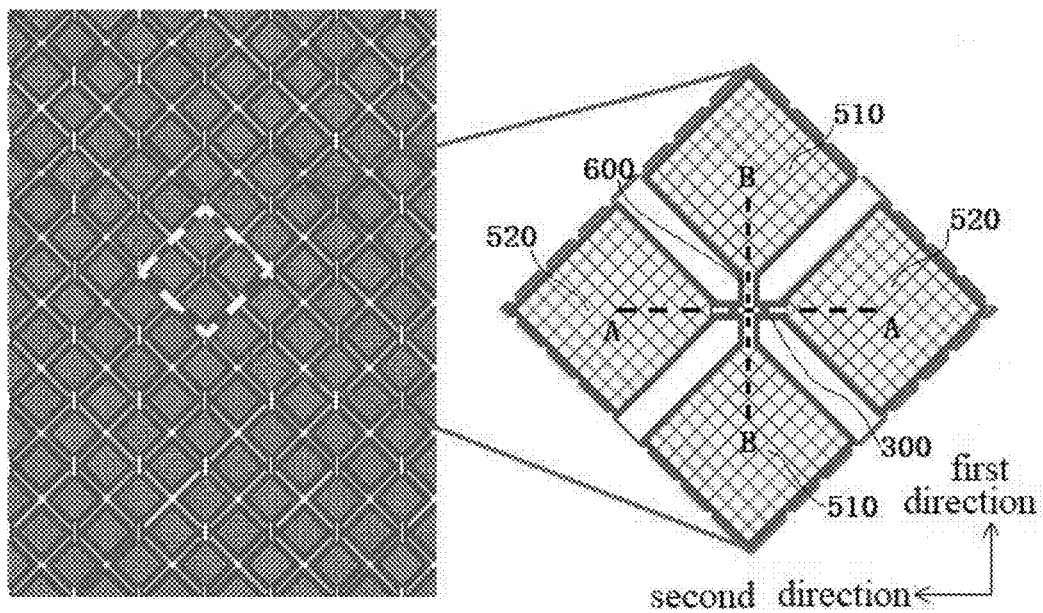
FIG. 1 is a schematic top structural view of a touch panel according to an embodiment of the present disclosure.

REFERENCE NUMBERS 100 substrate
200 base layer
210 groove
300 bridge electrode
400 filling layer
510 first sub-electrode
520 second sub-electrode
600 connection electrode
700 passivation layer
810 anode
820 light-emitting layer
830 cathode

DETAILED DESCRIPTION

The embodiments of the present disclosure are described in detail below. Those skilled in the art will understand that the following embodiments are intended to explain the present disclosure, and should not be regarded as limiting the present disclosure. In the case that specific technologies or conditions are not explicitly described in the following embodiments, a person skilled in the art can practice by following the common technologies or conditions in the art or following a product specification, unless specifically stated.

The present disclosure proposes a touch panel. The touch panel includes: a substrate; a base layer, where the base layer is located on a side of the substrate, and the base layer is provided with at least one groove, where each of the at least one groove is located between two adjacent first sub-electrodes in a first direction and between two adjacent second sub-electrodes in a second direction; at least one bridge electrode, where each of the at least one bridge electrode is located in a groove; a filling layer, where the filling layer is located on a side of the at least one bridge electrode away from the at least one groove; at least one connection electrode, where the at least one connection electrode is located on a side of the filling layer away from the at least one groove, and each of the at least one connection electrode is configured to connect two adjacent first sub-electrodes in the first direction; where each of the at least one bridge electrode is configured to connect two adjacent second sub-electrodes in the second direction.

It should be noted that, FIG. 1 only shows touch electrodes, connection electrodes, and bridge electrodes, and other layer structures such as the substrate, the base layer, and the filling layer are not shown.

Figure 2:
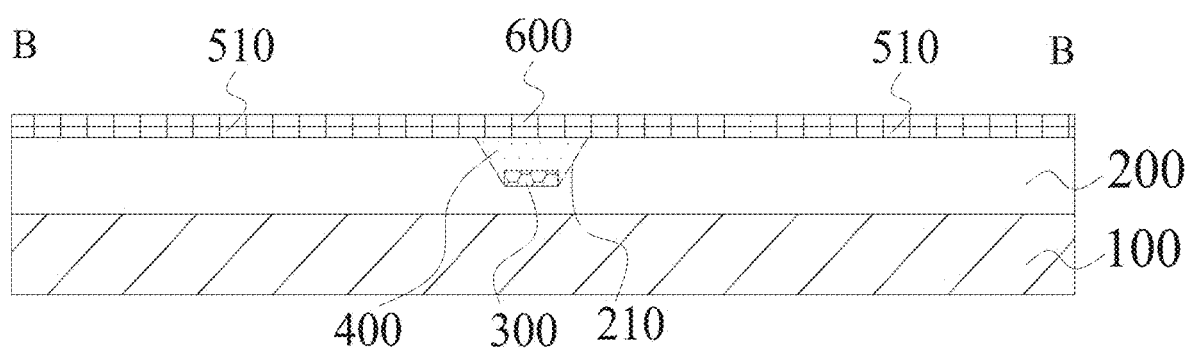
FIG. 2 is a schematic cross-sectional structure diagram along line BB in FIG. 1.
Figure 3:
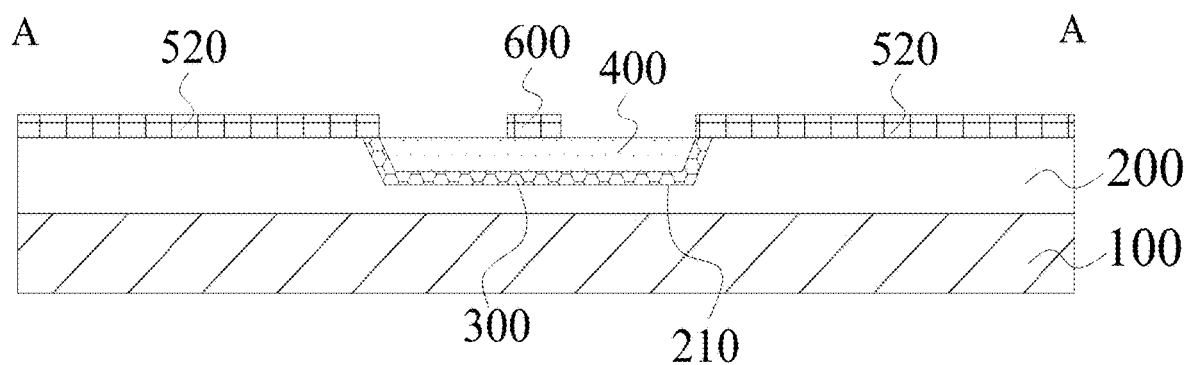
FIG. 3 is a schematic cross-sectional structure diagram along line AA in FIG. 1.

According to some embodiments of the present disclosure, referring to FIG. 1 to FIG. 3, a touch panel includes a substrate 100, a base layer 200, at least one bridge electrode 300, a filling layer 400, a plurality of parallel first touch electrodes, a plurality of parallel second touch electrodes and at least one connection electrode 600.

Referring to FIG. 2, the base layer 200 is located on a side of the substrate 100, and is provided with at least one groove 210, each groove 210 is located between two adjacent first sub-electrodes in a first direction and between two adjacent second sub-electrodes in a second direction. Each bridge electrode 300 is formed in a groove 210, and covers a bottom and a side wall of the groove. The filling layer 400 fills a side of the at least one bridge electrode 300 away from the groove 210.

A plurality of first touch electrodes and a plurality of second touch electrodes are disposed on a side of the base layer 200 away from the substrate 100. Referring to FIG. 1, the plurality of first touch electrodes and the plurality of second touch electrodes intersect each other, each of the plurality of first touch electrodes includes a plurality of first sub-electrodes 510 arranged at intervals in a first direction, each of the plurality of second touch electrodes includes a plurality of second sub-electrodes 520 arranged at intervals in a second direction. Optionally, the first direction is perpendicular to the second direction.

The at least one connection electrode 600 is located on a side of the filling layer 400 away from the groove 210. Referring to FIG. 1 and FIG. 2, each connection electrode 600 electrically connects two adjacent first sub-electrodes 510 in the first direction. Referring to FIG. 1 and FIG. 3, each bridge electrode 300 electrically connects two adjacent second sub-electrodes 520 in the second direction.

In the present disclosure, the groove 210 is formed by etching the base layer 200, and the bridge electrode 300 is fabricated by bending the wiring, so that first touch electrodes can extend in the direction of bridge electrodes 300 (i.e., the first direction), and second touch electrodes can extend in the direction perpendicular to the direction of bridge electrodes 300 (i.e., the second direction). In this way, the bent wiring design of the bridge electrodes 300 can ameliorate the stress concentration in the wires and avoid breakage, thereby improving the durability of the touch panel and effectively thinning the touch panel.

According to some embodiments of the present disclosure, referring to FIG. 2, connection electrodes 600 and first sub-electrodes 510 may be integrally formed, that is, the connection electrodes 600 and the first sub-electrodes 510 are made of the material and have the same thickness, so that the integrally formed first touch electrode has higher evenness and less stress concentration.

In some embodiments of the present disclosure, referring to FIG. 1, the connection electrode 600, first sub-electrodes 510 and second sub-electrodes may be arranged in a same layer, that is, the connection electrode 600, the first sub-electrodes 510 and the second sub-electrodes formed by an single patterning process are made of the same material and have the same thickness. In this way, after a whole layer of metal electrode material is deposited on an upper surface of the base layer 200 and the filling layer 400, the patterns of the connection electrode 600, the first sub-electrodes 510 and the second sub-electrodes may be lithographically etched in an single patterning process, so that the manufacturing process of the touch panel is simplified and the manufacturing cost is lower.

According to some embodiments of the present disclosure, an overlapping portion of an orthographic projection of the connection electrode 600 onto the substrate 100 and an orthographic projection of the bridge electrode 300 onto the substrate 100 is within an orthographic projection of the filling layer 400 onto the substrate 100. In this way, the filling layer 400 can better isolate the connection electrode 600 and the bridge electrode 300 on the upper and lower surfaces from each other, so as to avoid poor touch performance caused by crosstalk. Moreover, the upper surface of the filling layer 400 away from grooves 210 and the upper surface of the base layer 200 away from the grooves 210 may be flush, so that the connection electrode 600 and the first sub-electrodes 510 are completely on the same plane, thereby the risk that the connection electrode 600 breaks from the first sub-electrodes 510 when the touch panel is bent is reduced.

In some embodiments of the present disclosure, a slope angle of a groove 210 (the angle between the slope of a groove and an extension surface of a bottom surface of the groove) may range from 20 degrees to 70 degrees, so that the slope angle of the groove 210 can be controlled by adjusting the etching process. By using grooves 210 with the above-mentioned mild slope, the problem caused by excessive slope angle of the bridge electrode 300 can be mitigated.

In some specific examples, a depth of a groove 210 may be greater than a thickness of a bridge electrode 300. It should be noted that "depth" and "thickness" herein specifically refer to the distance along the direction perpendicular to the upper surface of the touch panel. In this way, the upper surface of the filling layer 400 formed on the surface of bridge electrodes 300 away from grooves 210 may be flush with the upper surface of the base layer 200, thereby improving the flexible bendability of the touch panel. In some specific examples, the maximum length of the groove 210 in the second direction may be greater than the width of the connection electrode 600 in the second direction.

In some embodiments of the present disclosure, the material forming the filling layer 400 may include an organic material. Thus, if being made of an elastic organic material, the filling layer 400 may deform when the touch panel is bent, thereby alleviating the stress concentration in the bent wiring to further improve the bendability of the touch panel. In addition, each film layer structure in the touch panel (including the base layer 200, the filling layer 400, etc.) can be made of a highly elastic organic material, such as polyimide (PI), polysiloxane, etc. In this way, the repeated bendability of the touch panel is increased.

Figure 4:
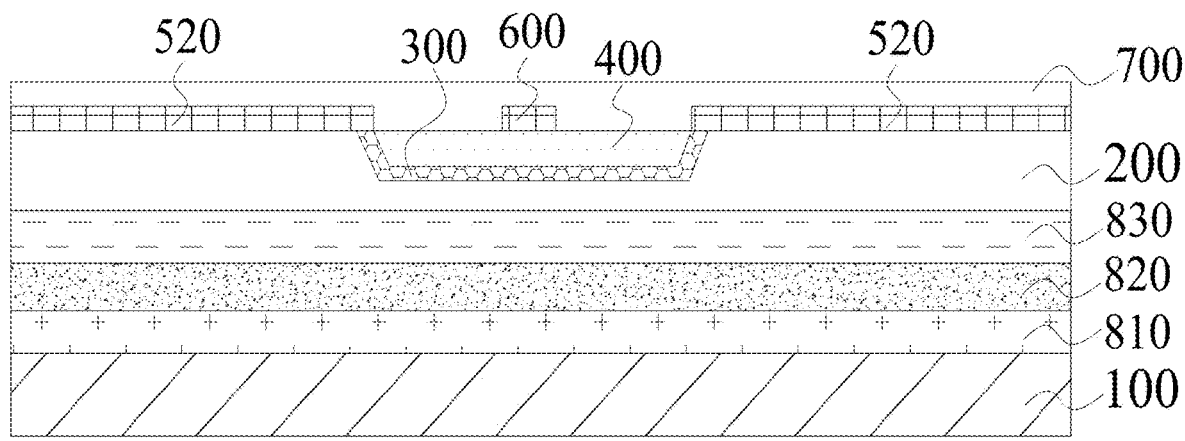
FIG. 4 is another schematic cross-sectional structure diagram of a touch panel according to an embodiment of the present disclosure.

According to some embodiments of the present disclosure, referring to FIG. 4, a touch panel may further include a passivation layer 700. The passivation layer 700 cover first sub-electrodes, second sub-electrodes, the connection electrode 600, the filling layer 400 and a part of the base layer 200. In this way, the passivation layer 700 can not only serve a purpose of planarization, but also protect touch electrodes when the touch panel is bent.

According to some embodiments of the present disclosure, referring to FIG. 4, the touch panel may further include an anode 810, a light-emitting layer 820 and a cathode 830, where the anode 810 may be disposed on the surface of the substrate 100, the light-emitting layer 820 is disposed on the surface of the anode 810 away from the substrate 100, and the cathode 830 is disposed on the surface of the light-emitting layer 820 away from the anode 810, and the anode 810, the light-emitting layer 820 and the cathode 830 are all disposed between the substrate 100 and the base layer 200, so that the touch panel can have a display function.

In summary, according to some embodiments of the present disclosure, the present disclosure proposes a touch panel. Grooves are etched in the base layer under the touch electrodes, and bridge electrodes are routed in the grooves. Not only the film layer is fully utilized to reduce the thickness of the touch panel, but also connection electrodes can be made after a surface-filling on the bridge electrode is performed, so that, while first touch electrodes and second touch electrodes intersecting each other are achieved, bridge electrodes according to the bent wiring design can mitigate the stress concentration in the wire to avoid the occurrence of breakage, thereby improving the durability of the touch panel.

In another aspect of the present disclosure, a display device including the above-mentioned touch panel is provided.

The specific type of the display device is not particularly limited, and commonly used types of display devices in the art may be used, such as a display screen, mobile phone, tablet computer, wearable device. Those skilled in the art can make a selection according to the specific usage requirements of the display device, which will not be detailed here. It should be noted that, in addition to the above-mentioned touch panel, the display device may also include necessary components and structures, such as a display panel, a control board, a housing, a power supply.

In summary, according to the embodiments of the present disclosure, the present disclosure proposes a display device. The display device includes a touch panel which is thinner and more durable, thereby making the display device lighter and thinner and having a longer service life. Those skilled in the art can understand that the features and advantages described above for the touch panel are still applicable to the display device, and will not be repeated here.

In another aspect of the present disclosure, a method of manufacturing a touch panel is proposed. The method includes:

providing a substrate;
forming a base layer on a side of the substrate;
etching the base layer to form at least one groove;
preparing a bridge electrode along a second direction in each of the at least one groove;
forming a filling layer on a side of the at least one bridge electrode away from the at least one groove;
forming at least one connection electrode, at least one first sub-electrode and at least one second sub-electrode on the base layer and the filling layer through a single patterning process.

According to some embodiments of the present disclosure, the method of manufacturing the touch panel further includes:

forming a passivation layer on the at least one first sub-electrode, the at least one second sub-electrode, the at least one connection electrode, the filling layer and a part of the base layer.

According to some embodiments of the present disclosure, the first direction is perpendicular to the second direction.

As an example, FIG. 5, FIG. 6, FIG. 7 and FIG. 8 are all schematic diagrams of a manufacturing process of a touch panel according to an embodiment of the present disclosure.

Figure 5:
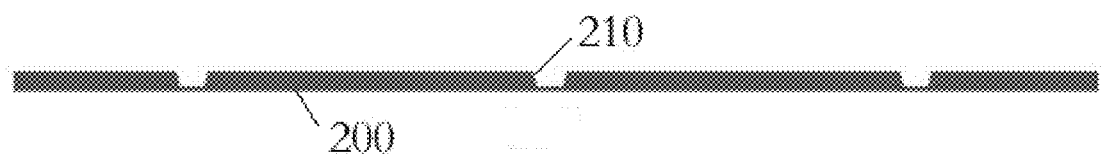
FIG. 5 is a schematic diagram of a manufacturing process of a touch panel according to an embodiment of the present disclosure.

As shown in FIG. 5, the base layer 200 is etched to form grooves 210; in the present disclosure, the etching process can be used to adjust the slope angle of the grooves, so that it is within a suitable angle range to avoid defects from occurring during the preparing of bridge electrodes in the grooves.

Figure 6:
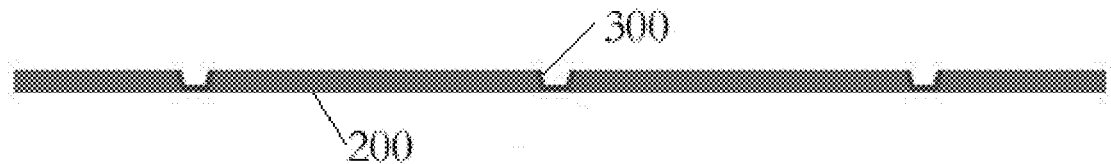
FIG. 6 is a schematic diagram of a manufacturing process of a touch panel according to an embodiment of the present disclosure.

As shown in FIG. 6, the bridge electrodes are prepared in the formed grooves; specifically, electrodes are made on the surface of the base layer 200, and after the electrodes are etched, electrodes in the grooves remain, that is, the bridge electrodes 300 are formed. The bridge electrodes extend along a second direction.

Figure 7:
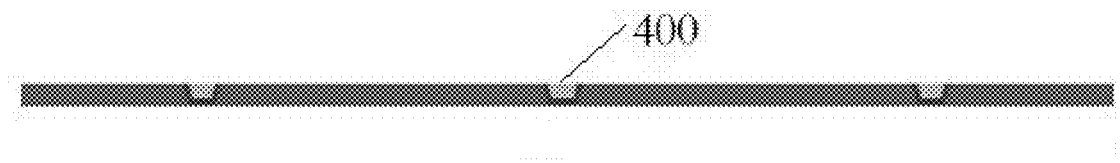
FIG. 7 is a schematic diagram of a manufacturing process of a touch panel according to an embodiment of the present disclosure.

As shown in FIG. 7, the grooves are filled. Optionally, the material used to fill the grooves is an organic material.

Figure 8:
FIG. 8 is a schematic diagram of a manufacturing process of a touch panel according to an embodiment of the present disclosure.

As shown in FIG. 8, through a single patterning process, electrodes are formed on the base layer and the electrodes are etched to form the connection electrodes 600 along a first direction, the first sub-electrodes and the second sub-electrodes, where each of the connection electrodes is configured to connect two adjacent first sub-electrodes in the first direction; each of the bridge electrodes is configured to connect two adjacent second sub-electrodes in the second direction.

Figure 9:
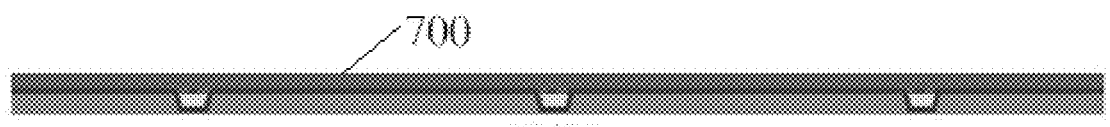
FIG. 9 is a schematic diagram of a manufacturing process of a touch panel according to an embodiment of the present disclosure.

As shown in FIG. 9, a passivation layer 700 is formed on the electrodes to protect the electrodes.

In the description of the present disclosure, it should be understood that the orientation or positional relationship indicated by the terms "width", "thickness", "depth", etc. is based on the orientation or positional relationship shown in the drawings, and is just intended to facilitate the description of the present disclosure and simplify the description, rather than indicating or implying that the device or element referred to must have a specific orientation, be constructed and operated in a specific orientation, and therefore cannot be construed as limiting the present disclosure.

In addition, the terms "first" and "second" are only used for description purposes, and cannot be understood as indicating or implying relative importance or implicitly indicating the quantity of indicated technical features. Thus, the features defined by "first" and "second" may include at least one such feature either explicitly or implicitly. In the description of the present disclosure, "a plurality of" means at least two, for example, two, three, etc., unless specifically defined otherwise.

In the description of this specification, the description in reference to expressions "an embodiment", "some embodiments", "example", "specific examples", or "some examples" means that specific features, structures, materials, or characteristics described in conjunction with the embodiment or example are included in at least one embodiment or example of the present disclosure. In this specification, statements in reference to the above terms do not necessarily refer to the same embodiment or example. Moreover, the specific features, structures, materials, or characteristics described may be combined in any one or more embodiments or examples as appropriate. In addition, those skilled in the art may combine different embodiments or examples described in this specification and features of the different embodiments or examples, without contradicting each other.

Although the embodiments of the present disclosure have been shown and described above, it can be understood that the above-mentioned embodiments are exemplary and cannot be construed as limitations on the present disclosure, and those of ordinary skill in the art can make changes, modifications, substitutions, and variations to the above-mentioned embodiments without departing from the scope of the present disclosure.

What is claimed is:

1. A touch panel, comprising:
   a substrate;
   a base layer located on a side of the substrate, wherein the base layer is provided with at least one groove, and each of the at least one groove is located between two adjacent first sub-electrodes in a first direction and located between two adjacent second sub-electrodes in a second direction;
   at least one bridge electrode, wherein each of the at least one bridge electrode is located in one of the at least one groove;
   a filling layer, wherein the filling layer is located on a side of the at least one bridge electrode away from the at least one groove;
   at least one connection electrode, wherein the at least one connection electrode is located on a side of the filling layer away from the at least one groove, and each of the at least one connection electrode is configured to connect two adjacent first sub-electrodes in the first direction;
   wherein each of the at least one bridge electrode is configured to connect two adjacent second sub-electrodes in the second direction.

2. The touch panel according to claim 1, wherein each of the at least one bridge electrode covers a bottom and a side wall of one of the at least one groove.

3. The touch panel according to claim 1, wherein the at least one connection electrode and first sub-electrodes are integrally formed.

4. The touch panel according to claim 3, wherein the at least one connection electrode, the first sub-electrodes and the second sub-electrodes are arranged in a same layer.

5. The touch panel according to claim 1, wherein an overlapping portion of an orthographic projection of the at least one connection electrode onto the substrate and an orthographic projection of the at least one bridge electrode onto the substrate is within an orthographic projection of the filling layer onto the substrate.

6. The touch panel according to claim 1, wherein a slope angle of each of the at least one groove ranges from 20 degrees to 70 degrees.

7. The touch panel according to claim 6, wherein a depth of each of the at least one groove is greater than a thickness of each of the at least one bridge electrode.

8. The touch panel according to claim 6, wherein a length of each of the at least one groove in the second direction is greater than a width of each of the at least one connection electrode in the second direction.

9. The touch panel according to claim 1, wherein the filling layer is made of an organic material.

10. The touch panel according to claim 1, further comprising:
    a passivation layer, wherein the passivation layer cover the first sub-electrodes, the second sub-electrodes, the at least one connection electrode, the filling layer and a part of the base layer.

11. The touch panel according to claim 1, wherein the first direction is perpendicular to the second direction.

12. A display device, comprising the touch panel according to claim 1.

* * * * *